United States Patent
Magel

(10) Patent No.: US 11,404,707 B2
(45) Date of Patent: Aug. 2, 2022

(54) CONVEYING DEVICE FOR A FUEL CELL ASSEMBLY FOR CONVEYING AND/OR RECIRCULATING A GASEOUS MEDIUM

(71) Applicant: Robert Bosch GmbH, Stuttgart (DE)

(72) Inventor: Hans-Christoph Magel, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 274 days.

(21) Appl. No.: 16/762,135

(22) PCT Filed: Oct. 24, 2018

(86) PCT No.: PCT/EP2018/079191
§ 371 (c)(1),
(2) Date: May 6, 2020

(87) PCT Pub. No.: WO2019/115074
PCT Pub. Date: Jun. 20, 2019

(65) Prior Publication Data
US 2020/0365918 A1 Nov. 19, 2020

(30) Foreign Application Priority Data
Dec. 11, 2017 (DE) ...................... 10 2017 222 390.1

(51) Int. Cl.
*H01M 8/04089* (2016.01)
*H01M 8/04082* (2016.01)
(Continued)

(52) U.S. Cl.
CPC ......... *H01M 8/04097* (2013.01); *B60L 50/72* (2019.02); *F04F 5/16* (2013.01);
(Continued)

(58) Field of Classification Search
CPC .................................. H01M 8/04097
See application file for complete search history.

(56) References Cited

U.S. PATENT DOCUMENTS 9,595,725 B2    3/2017  Mathie et al.
2005/0208357 A1* 9/2005  Bitzer ............... H01M 8/0662
                                                                429/457
(Continued)

FOREIGN PATENT DOCUMENTS

DE   10 2004 049 623 A1   4/2006
DE      112009001821 T5   6/2011
(Continued)

OTHER PUBLICATIONS

International Search Report corresponding to PCT Application No. PCT/EP2018/079191, dated Feb. 21, 2019 (German and English language document) (5 pages).

*Primary Examiner* — Brian R Ohara
(74) *Attorney, Agent, or Firm* — Maginot, Moore & Beck LLP

(57) ABSTRACT

A conveying device for a fuel cell system for conveying and/or recirculating a gaseous medium, in particular hydrogen, includes a recirculation fan, a jet pump that is driven by a motive stream of a gaseous medium that is under pressure, and a metering valve. The gaseous medium is supplied to the jet pump by the metering valve. The conveying device further includes an inlet fluidically connected to an anode outlet of the fuel cell and an outlet fluidically connected to an anode inlet of the fuel cell. The jet pump and the metering valve form a combined valve/jet-pump assembly. The components of the conveying device are positioned on a planar carrier element such that flow lines between and/or within the components extend only parallel to the planar carrier element. The planar carrier element is arranged between the fuel cell and the conveying device.

20 Claims, 4 Drawing Sheets

(51) Int. Cl.
*B60L 50/72* (2019.01)
*F04F 5/16* (2006.01)
*B60K 15/03* (2006.01)

(52) U.S. Cl.
CPC . *H01M 8/04201* (2013.01); *B60K 2015/0325* (2013.01); *B60K 2015/03256* (2013.01); *B60K 2015/03315* (2013.01)

(56) References Cited

U.S. PATENT DOCUMENTS

| | | | |
|---|---|---|---|
| 2012/0244455 A1 | 9/2012 | Wilson et al. | |
| 2013/0295491 A1* | 11/2013 | Takeyama | H01M 8/0228 429/513 |
| 2015/0125767 A1* | 5/2015 | Wake | H01M 8/0491 429/414 |
| 2015/0214566 A1* | 7/2015 | Jung | H01M 8/0267 429/458 |
| 2017/0179504 A1* | 6/2017 | Honda | H01M 8/04007 |
| 2017/0250425 A1* | 8/2017 | Koiwa | H01M 8/04649 |
| 2018/0175422 A1* | 6/2018 | Jung | H01M 8/04089 |
| 2019/0081340 A1* | 3/2019 | Chikugo | H01M 8/04738 |

FOREIGN PATENT DOCUMENTS

| | | |
|---|---|---|
| DE | 102011105710 A1 | 12/2012 |
| DE | 112011105389 T5 | 3/2014 |
| DE | 102015119275 A1 | 5/2016 |
| JP | 2007-52948 A | 3/2007 |
| JP | 2012-501055 A | 1/2012 |
| JP | 2013-235813 A | 11/2013 |
| WO | 2008043377 A1 | 4/2008 |

\* cited by examiner

CONVEYING DEVICE FOR A FUEL CELL ASSEMBLY FOR CONVEYING AND/OR RECIRCULATING A GASEOUS MEDIUM

This application is a 35 U.S.C. § 371 National Stage Application of PCT/EP2018/079191, filed on Oct. 24, 2018, which claims the benefit of priority to Serial No. DE 10 2017 222 390.1, filed on Dec. 11, 2017 in Germany, the disclosures of which are incorporated herein by reference in their entirety.

BACKGROUND

The present disclosure relates to a conveying device for a fuel cell system for conveying and controlling a gaseous medium, in particular hydrogen, which is provided in particular for use in vehicles having a fuel cell drive.

In the automotive sector, in addition to liquid fuels, gaseous fuels will also become increasingly important in future. In particular in vehicles with a fuel cell drive, hydrogen gas flows have to be controlled. The gas flows are in this instance no longer controlled in a discontinuous manner as with the injection of liquid fuel, but instead gas is removed from at least one high-pressure tank and directed via a supply line of a medium-pressure line system to the conveying device. This conveying device guides the gas via a connection line of a low-pressure line system to a fuel cell.

DE 10 2011 105 710 A1 discloses a conveying device for a fuel cell system for conveying and/or recirculating a gaseous medium, having a recirculation fan and a jet pump which is driven by a jet stream of a pressurized gaseous medium, wherein an anode output of a fuel cell is connected in fluid terms to an input of the conveying device, an output of the conveying device is connected in fluid terms to an anode input of the fuel cell.

U.S. Pat. No. 9,595,725 B2 discloses a conveying device for a fuel cell system for conveying and/or recirculating a gaseous medium, in which the pressurized gaseous medium is supplied to the jet pump by means of a metering valve and wherein the jet pump and the metering valve form a combined valve/jet pump arrangement.

The conveying devices known from DE 10 2011 105 710 A1 and U.S. Pat. No. 9,595,725 B2 may have some disadvantages. According to the disclosure, the components of the conveying device, in particular the recirculation fan and/or the jet pump and/or the metering valve are connected at least partially by means of fluid connections in the form of pipelines and/or a distributor plate with internal channels to each other and/or to the fuel cell. In this instance, there are many flow redirections and consequently flow losses, in particular in all three spatial directions. The degree of efficiency of the conveying device is thereby reduced. Furthermore, the connection of the components of the conveying device by means of pipelines is disadvantageous in that the pipelines over the service-life of the conveying device, in particular in the event of significant temperature fluctuations, can lead to sealing problems, in particular with welded and/or bonded pipelines.

SUMMARY

According to the disclosure, a conveying device for a fuel cell system is proposed for conveying and/or recirculating a gaseous medium, in particular hydrogen, wherein the hydrogen is referred to below as $H_2$.

With reference to the disclosure, the conveying device is constructed in such a manner that the components of the conveying device are positioned on a plate-like carrier element in such a manner that the flow lines between and/or within the components of the conveying device extend exclusively parallel with the plate-like carrier element, wherein the plate-like carrier element is arranged between a fuel cell and the conveying device. In this manner, a direct flow line which is as short as possible can be produced between the components of the conveying device. Furthermore, the number of flow redirections and/or changes of a flow direction of the gaseous medium in the conveying device can be reduced to the lowest possible number. This affords the advantage that the flow losses and/or pressure losses within the conveying device as a result of the length of the flow lines and/or the number of flow redirections can be reduced. It is additionally further advantageous for the flow lines between and/or within the components of the conveying devices to extend parallel with the plate-like carrier element. Consequently, a flow redirection of the gaseous medium is further reduced, whereby the flow losses within the conveying device can be further reduced. The degree of efficiency of the conveying device can thereby be improved and the energy consumption for operating the conveying device can be reduced.

The arrangement of the components of the conveying device on the plate-like carrier element is further advantageous, whereby a simple positioning of the components with respect to each other can be brought about by the components in each case having to be connected to the plate-like carrier element. The required number of components for the assembly can thereby be reduced, which in turn leads to a cost saving of the conveying device. Furthermore, the probability of an assembly error as a result of components of the conveying device which are incorrectly orientated with respect to each other is reduced, which in turn reduces the probability of failure of the conveying device during operation.

As a result of the measures set out in the dependent claims, advantageous developments of the conveying device set out in the disclosure are possible. The dependent claims relate to preferred developments of the disclosure.

According to an advantageous embodiment of the conveying device, the gaseous medium flows through the conveying device in a plane which extends at least substantially parallel with the plate-like carrier element. Furthermore, a redirection and/or flow guiding of the gaseous medium in the conveying device as carried out within the plane of the conveying device is carried out exclusively in the region of a recirculation fan and/or a valve/jet pump arrangement. In this manner, the advantage can be afforded that the gaseous medium flows exclusively in the plane through the conveying device, whereby the movement direction of the gaseous medium is limited to two dimensions. A redirection of the gaseous medium in a third dimension is completely prevented. The gaseous medium can thereby be moved with a small number of flow redirections and/or changes of the flow directions through the conveying device, which leads to reduced flow losses and/or pressure losses. This in turn increases the degree of efficiency of the conveying device. Furthermore, as a result of a minimization of the flow redirections and/or change of the flow direction, the noise level of the conveying device during operation, in particular during full-load operation, of the fuel cell system can be reduced.

According to an advantageous development of the conveying device, the recirculation fan forms a first flow connection, wherein the first flow connection is constructed as part of a housing of the recirculation fan, and wherein the first flow connection opens directly into a first inlet of the valve/jet pump arrangement. In this manner, the advantage can be achieved that the recirculated medium which is in particular the unused gaseous recirculated medium from the fuel cell is compressed by the recirculation fan and afterwards is conveyed directly and/or via the shortest possible first flow connection into the region of a jet pump in which it comes into contact with a propellant and is driven by the propellant. The advantage can thereby be afforded that the degree of efficiency of the jet pump can be increased, whereby an optimum jet pump effect in the conveying device can be achieved at almost all operation points. The degree of efficiency of the entire fuel cell system can thereby be improved since an optimum conveying action of the conveying device in different operating states of the fuel cell system can be ensured. Furthermore, the flow losses and/or pressure losses of the gaseous medium between the recirculation fan and the jet pump can be reduced since the first flow connection can be constructed to be as short as possible.

According to a particularly advantageous embodiment of the conveying device, it has a water separator, wherein the water separator is located between the anode output of the fuel cell and the recirculation fan. In this instance, the water separator is connected in fluid terms to the anode output of the fuel cell and the recirculation fan and the water separator forms a direct second flow connection with respect to the recirculation fan. In this manner, it is possible to prevent water which is produced during operation of the fuel cell and which together with the gaseous medium, in particular $H_2$, flows back through the anode output into the conveying device from being able to be introduced into the recirculation fan and/or the jet pump and/or a metering valve since it is already directly separated by the water separator from the gaseous medium and is conveyed out of the conveying device. It is thereby possible for damage to the components of the conveying device, in particular the movable parts of the components, as a result of corrosion to be prevented, whereby the service-life of the entire conveying device is increased. Furthermore, as a result of an early and rapid separation of the water in the conveying device, the degree of efficiency of the conveying device can be increased. This is a result of the fact that the water does not also have to be conveyed through additional components of the conveying device with the gaseous medium, in particular $H_2$, which would bring about a reduction of the degree of efficiency since, for the proportion of water in the conveying device, less of the gaseous medium can be conveyed and since water has a higher mass. Consequently, as a result of the use and the respective arrangement of the water separator, the advantage can be afforded that the degree of efficiency of the conveying device can be increased.

According to an advantageous embodiment of the conveying device, the second flow connection is constructed as part of the housing of the recirculation fan, wherein the second flow connection opens directly into an outlet of the water separator. In this manner, the flow losses and/or pressure losses between the components water separator and recirculation fan can be reduced since the flow connections between the components have the smallest possible length. As a result of the small length, there is produced a small friction loss of the gaseous medium with the inner surface of the flow connections, whereby the flow loss and/or pressure loss also remain small. Consequently, the degree of efficiency of the conveying device can be improved. Furthermore, as a result of the embodiment of the second flow connection as part of the housing of the recirculation fan, a compact and space-saving construction can be achieved.

According to a particularly advantageous embodiment of the conveying device, the first flow connection forms a connection spigot, in particular a cylindrical first connection spigot, having a first internal flow channel, wherein the first connection spigot of the recirculation gas protrudes in the direction of the first flow channel away from the recirculation fan. Furthermore, the first connection spigot of the first flow connection protrudes into a first recess, in particular a cylindrical first recess, of the valve/jet pump arrangement, wherein a sealing is carried out between the first connection spigot and the first recess by means of a first sealing ring which is located between the outer diameter of the first connection spigot and the inner diameter of the first recess. In this manner, the advantage can be afforded that the recirculation fan can be connected in fluid terms to the jet pump, and wherein the components can further be fixed to each other. In particular, in this instance, the first internal flow channel of the recirculation fan can be connected to the first inlet of the jet pump so that the first flow connection is formed. This has the advantage that the components recirculation fan and jet pump can be connected to each other in fluid terms in a single assembly step in a cost-effective assembly method and at the same time can be fixed to each other. This is in contrast to a complex fluid connection by means of pipework and/or a distributor plate, on the one hand, and an additional fixing of the components, on the other hand. The assembly costs of the conveying device can thereby be reduced. Furthermore, the risk of assembly errors in the fluid connection and/or the fixing of the components to each other is reduced, which reduces the probability of failure of the conveying device. Furthermore, the advantage can be afforded that a compact and space-saving arrangement of the components recirculation pump and jet pump can be achieved, whereby the required installation space of the conveying device is reduced, which in turn leads to further advantages during transport of the product to the customer and during installation of the conveying device in the fuel cell system and with regard to the spatial requirement in the entire fuel cell system. Another advantage can be achieved by the inserted first sealing ring so that a reliable encapsulation of the first flow connection can be achieved so that a discharge of gaseous medium can be reduced, whereby the degree of efficiency of the conveying device can be improved.

According to an advantageous development, the second flow connection forms a second connection spigot, in particular a cylindrical second connection spigot, having a second internal flow channel, wherein the second connection spigot of the recirculation fan protrudes away from the recirculation fan in the direction of the second flow channel. Furthermore, the second connection spigot of the second flow connection protrudes into a second recess, in particular a cylindrical second recess, of the water separator, wherein a sealing is produced between the second connection spigot and the second recess by a second sealing ring which is located between the outer diameter of the second connection spigot and the inner diameter of the second recess. In this manner, a number of advantages which are described below can be afforded. Consequently, the advantage are afforded that the recirculation fan can be connected in fluid terms to the water separator, wherein the components can be further fixed to each other. In this instance, the second internal flow channel of the recirculation fan can be connected to the outlet of the water separator so that the second flow connection is formed. This has the advantage that the components recirculation fan and jet pump can be connected to each other in fluid terms in a single assembly step in a cost-effective assembly method. This is in contrast to a complex fluid connection using pipework and an additional fixing of the components. The assembly costs of the conveying device can thereby be reduced. Furthermore, the risk of assembly errors in the fluid connection and/or the fixing of the components to each other is reduced, which reduces the probability of failure of the entire conveying device. Furthermore, the advantage can be afforded that a compact and space-saving arrangement of the components recirculation pump and jet pump can be achieved, which in turn reduces the required installation space of the conveying device. A more compact construction of the entire conveying device can thereby be achieved. Furthermore, as a result of the small length of the second flow connection between the water separator and the recirculation pump, a smaller friction loss of the gaseous medium with the inner surface of the second flow connection takes place, whereby the flow loss and/or the pressure loss also remain(s) small. Consequently, the degree of efficiency of the conveying device can be improved. Furthermore, as a result of the construction of the second flow connection as part of the housing of the recirculation fan, a compact and space-saving construction of the conveying device can be achieved. Another advantage can be achieved by the used second sealing ring so that a reliable encapsulation of the second flow connection can be achieved so that a discharge of the gaseous medium can be reduced, whereby the degree of efficiency of the conveying device can be improved.

According to an advantageous embodiment, the first flow connection is constructed as a first connection plate with the first internal flow channel, wherein the first connection plate is constructed as part of the housing of the recirculation fan, and wherein the first connection plate of the recirculation fan protrudes in the direction of the first flow channel away from the recirculation fan. Furthermore, the housing of the recirculation fan is in abutment by means of the first connection plate with the valve/jet pump arrangement in the direction of the first flow channel, wherein the first sealing ring is located in the direction of the first flow channel and/or peripherally around the first flow channel between the first connection plate and the valve/jet pump arrangement. In this manner, the advantage can be afforded that a positioning of the components recirculation fan and jet pump with respect to each other on the closure plate can be carried out, regardless of tolerance deviations of the components with respect to each other, in particular in the direction of the first flow connection. A rapid assembly can thereby be ensured and the assembly costs can consequently be reduced. Furthermore, the components recirculation fan and jet pump can be connected to each other as a compact assembly group. Furthermore, as a result of the small length of the first flow connection between the components which is possible as a result of the configuration of the first flow connection with the first connection plate, a smaller friction loss of the gaseous medium with the inner surface of the first flow connection takes place, whereby the flow loss and/or pressure loss remains low. Consequently, the degree of efficiency of the conveying device can be improved.

According to a particularly advantageous development, the second flow connection is constructed as a second connection plate with the second internal flow channel, wherein the second connection plate of the recirculation fan is constructed as part of the housing of the recirculation fan and wherein the second connection plate of the recirculation fan protrudes in the direction of the second flow channel away from the recirculation fan. Furthermore, the housing of the recirculation fan is in abutment by means of the second connection plate with the water separator in the direction of the second flow channel, wherein the second sealing ring is located in the direction of the second flow channel and/or peripherally around the second flow channel between the second connection plate and the water separator. In this manner, the advantage can be afforded that a positioning of the components recirculation fan and water separator with respect to each other on the closure plate can be carried out regardless of tolerance deviations of the components with respect to each other, in particular in the direction of the first flow connection. A rapid assembly of the components recirculation pump and water separator on each other can thereby be ensured and the assembly costs can consequently be reduced. Furthermore, the components recirculation fan and jet pump can be connected to each other in a compact manner. Furthermore, as a result of the small length of the first flow connection between the components, which is possible as a result of the configuration of the first flow connection with the first connection plate, a smaller friction loss of the gaseous medium with the inner surface of the first flow connection takes place, whereby the flow loss and/or the pressure loss remain(s) low. Consequently, the degree of efficiency of the conveying device can be improved.

According to an advantageous embodiment, the first internal flow channel forms a curvature inside the housing of the recirculation fan, wherein a redirection and/or flow guiding of the gaseous medium in the first flow channel is carried out by the curvature. This affords the advantage that, in particular as a result of the arrangement of the components water separator, recirculation pump and valve/jet pump arrangement with respect to each other, a necessary redirection of the gaseous medium in the plane which extends parallel with the plate-like carrier element is carried out in such a manner that the flow losses and/or pressure losses as a result of the redirection can be kept as low as possible. To this end, the radius of the curvature is selected in such a manner that the friction losses between the gaseous medium and the inner surface of the first internal flow channel are as low as possible. In this instance, the radius of curvature and/or the diameter of the first flow channel in the flow direction is/are advantageously varied, for example, by means of tapering, so that the lowest possible friction occurs. Consequently, as a result of the flow redirections and/or change of the flow directions of the gaseous medium through the curvature, pressure losses and friction losses can be reduced, whereby the degree of efficiency of the recirculation fan and/or the valve/jet pump arrangement and/or the entire conveying device are improved. As a result of the integration of the curvature in the housing of the recirculation fan, the advantage can be afforded that there is the smallest possible spacing between the outlet of a compressor region and the curvature, whereby an increased dynamic pressure, in particular a backpressure, is built up as a result of the curvature at the outlet opening of the side channel. This may have an advantageous effect on the degree of efficiency of the recirculation fan at different operating points of the conveying device and/or the fuel cell system since an increased dynamic pressure has an advantageous effect on a rapid formation of a favorable conveying action of the recirculation fan. In addition, an integration of the curvature in the housing of the recirculation fan is advantageous in that no additional structural space for the conveying device, for example, in the form of additional pipework between the recirculation fan and the valve/jet pump arrangement, is required. Consequently, the advantage of a compact construction type of the conveying device can be achieved.

BRIEF DESCRIPTION OF THE DRAWINGS

With reference to the drawings, the disclosure is described in greater detail below.

In the drawings.

DETAILED DESCRIPTION

Figure 1:
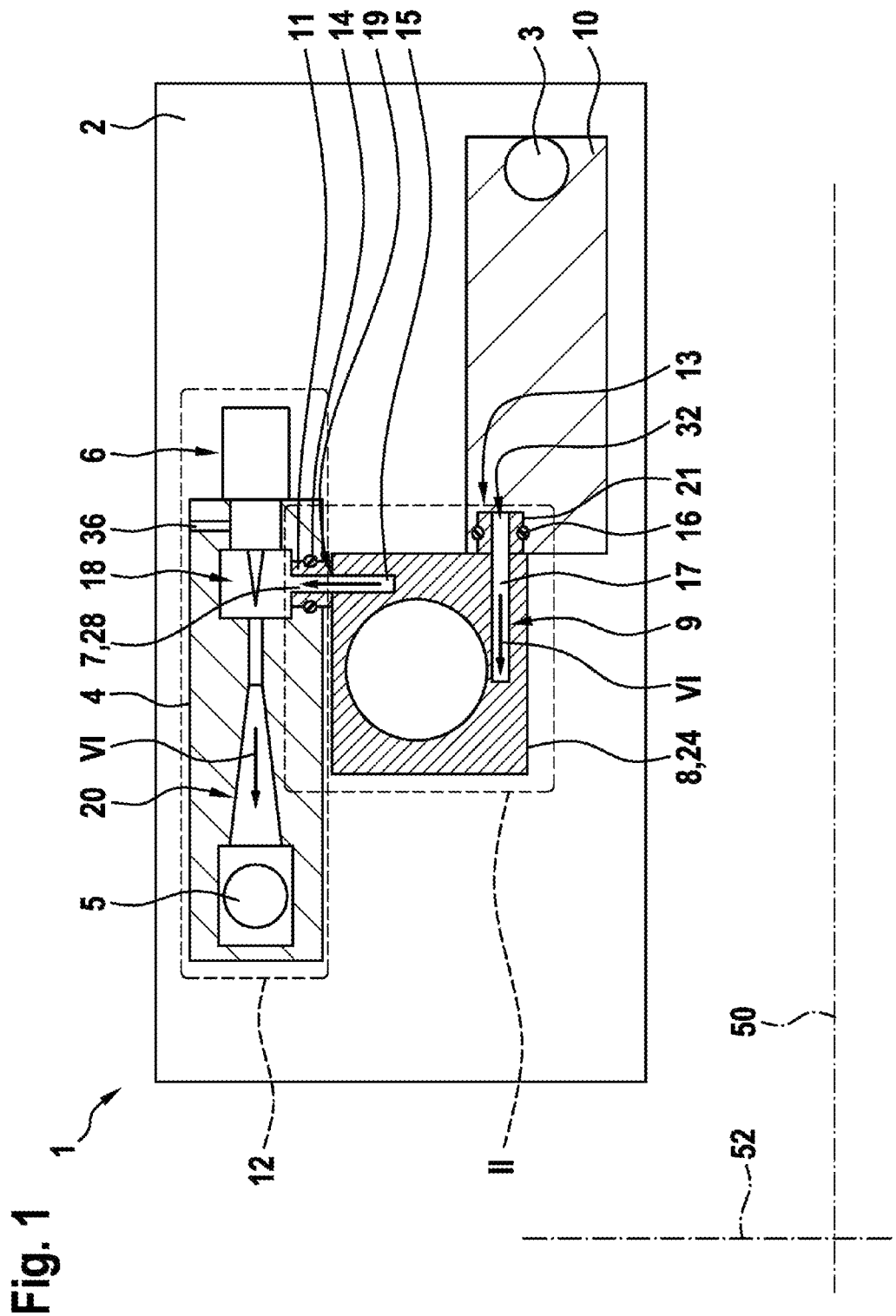
FIG. 1 is a plan view of a conveying device having the components combined valve/jet pump arrangement, recirculation fan and water separator which are positioned on a plate-like carrier element according to a first embodiment.

The illustration according to FIG. 1 is a plan view of a first embodiment of a conveying device 1 according to the disclosure.

FIG. 1 shows that the conveying device 1 has a plate-like carrier element 2, on which the components jet pump 4, metering valve 6, recirculation fan 8 and water separator 10 are fitted. The conveying device 1 serves in this instance to convey and/or recirculate a gaseous medium, in particular $H_2$. Furthermore, the jet pump 4 is driven by a pressurized gaseous medium, wherein the pressurized gaseous medium, which is in particular a propellant, is supplied to the jet pump 4 by means of the metering valve 6. In addition, the metering valve 6 and the jet pump 4 form a combined valve/jet pump arrangement 12, wherein the metering valve 6 is integrated at least partially in the jet pump 4. The combined valve/jet pump arrangement 12 additionally has a first inlet 28, a second inlet 36, an intake region 18 and a diffuser region 20. The recirculation fan 8 forms a first flow connection 7, wherein the first flow connection 7 is constructed as part of a housing 24 of the recirculation fan 8 and wherein the first flow connection 7 opens directly in the first inlet 28 of the valve/jet pump arrangement 12. Consequently, the recirculation fan 8 and the valve/jet pump arrangement 12, in particular the jet pump 4, are connected in fluid terms to each other by means of the first flow connection 7. In this instance, the first flow connection 7 forms a first connection spigot 11, in particular a cylindrical first connection spigot 11, having a first internal flow channel 15, wherein the first connection spigot 11 is constructed as part of the housing 24 of the recirculation fan 8 and protrudes in the direction of the first flow channel 15 away from the recirculation fan 8. The first flow channel 15 is in this instance constructed as an internal pipework which extends in the housing 24 of the recirculation fan 8 and serves to guide the flow of the gaseous medium. The first connection spigot 11 of the first flow connection 7 and/or the housing 24 protrudes in this instance into a first recess 19, in particular a cylindrical first recess 19, of the valve/jet pump arrangement 12, wherein a sealing between the first connection spigot 11 and the first recess 19 is carried out by means of a first sealing ring 14, wherein this is in particular a first sealing ring 14 of a resilient material, for example, an O-ring. The first flow connection 7 merges in the region of the jet pump 4 into the first inlet 28. A plate-like carrier element 2 extends in this instance in the direction of a longitudinal axis 50 and a transverse axis 52 and/or parallel with a plane 48 formed by the longitudinal axis 50 and the transverse axis 52.

In addition, on the one hand, a gaseous medium which in particular is a recirculation medium flows through the conveying device 1, wherein the recirculation medium after completely flowing through a fuel cell 24 (shown in FIG. 3) flows through the conveying device 1 again. On the other hand, the propellant is supplied to the conveying device 1, wherein the propellant is supplied by means of a supply line from a tank, in particular a high-pressure tank of the fuel cell system 31.

It is further shown in FIG. 1 that the water separator 10 is located between an anode output 3 and the recirculation fan 8 and is connected thereto in fluid terms. In this instance, the water separator 10 forms a direct second flow connection 9 with respect to the recirculation fan 8 and is connected thereto in fluid terms. The second flow connection 9 is in this instance constructed as part of the housing 24 of the recirculation fan 8, wherein the second flow connection 9 opens directly in an outlet 32 of the water separator 10. The second flow connection 9 forms in this instance a second connection spigot 13, in particular a cylindrical second connection spigot 13, having a second internal flow channel 17, wherein the second connection spigot 13 is constructed as part of the housing 24 of the recirculation fan 8 and protrudes in the direction of the second flow channel 17 away from the recirculation fan 8. The second flow channel 17 is in this instance constructed as an internal pipework which extends in the housing 24 of the recirculation fan 8 and serves to guide the flow of the gaseous medium. The second connection spigot 13 of the second flow connection 9 and/or the housing 24 protrudes in this instance into a second recess 21, in particular a cylindrical second recess 21 of the water separator 10, wherein a sealing is carried out between the second connection spigot 13 and the second recess 21 by means of a second sealing ring 16, wherein this is in particular a second sealing ring 16 of a resilient material, for example, an O-ring. In this case, the second sealing ring 16 is located between the outer diameter of the second connection spigot 13 and the inner diameter of the second recess 21.

It is further shown in FIG. 1 that, on the one hand, an input of the conveying device 1 is connected to the anode output 3 of the fuel cell 29, in particular in fluid terms, and, on the other hand, an anode input 5 is connected to the output of the conveying device 1, in particular in fluid terms. An exemplary flow passage of the gaseous medium, which is in particular the recirculation medium, from the fuel cell 29 through the conveying device 1 is carried out in the sequence water separator 10, recirculation fan 8, valve/jet pump arrangement 12. The gaseous medium flows in this instance in a flow direction VI through the components.

Within the jet pump 4 and/or the valve/jet pump arrangement 12, a so-called jet pump effect takes place. To this end, the gaseous propellant, in particular $H_2$, flows through the second inlet 36 from outside the valve/jet pump arrangement 12 into the metering valve 6, in particular from a high-pressure tank. Furthermore, the recirculation medium from the recirculation fan 8 is conveyed through the first flow connection 7 and the first inlet 28 into the intake region 18 of the jet pump 4. The propellant is now introduced by opening the metering valve 6, in particular under high pressure, into the intake region 18. In this instance, the gaseous propellant flows in the direction of the flow direction VI. The $H_2$ which flows from the second inlet 36 into the intake region 18 and which acts as a propellant has a pressure difference with respect to the recirculation medium which flows from the first inlet 28 into the intake region 18, wherein the propellant in particular has a higher pressure of at least 10 bar. So that the jet pump effect is produced, the recirculation medium is conveyed at a low pressure and with a small mass flow into the intake region 18 of the jet pump 4. In this instance, the propellant flows with the described pressure difference and at a high speed which is in particular close to the speed of sound through the metering valve 6 into the intake region 18. In this instance, the propellant strikes the recirculation medium, which is already located in the intake region 18. As a result of the high speed and/or pressure difference between the propellant and the recirculation medium, an inner friction and turbulences between the media are produced. In this instance, there is produced a shearing stress in the boundary layer between the rapid propellant and the significantly slower recirculation medium. This stress brings about a pulsed transmission, wherein the recirculation medium is accelerated and is carried along. The mixing is carried out in accordance with the principle of conservation of momentum. In this instance, the recirculation medium is accelerated in the flow direction VI and there is also produced a pressure drop for the recirculation medium, whereby a suction effect begins and consequently additional recirculation medium is conveyed from the region of the first inlet 28 and/or the first flow connection 7. As a result of a change and/or regulation of the opening time and the opening frequency of the metering valve 6, a conveying rate of the recirculation medium can be regulated and adapted to the respective requirement of an entire fuel cell system 31 (not shown in FIG. 1, cf. FIG. 3) depending on the operating state and the operating requirements.

Figure 2:
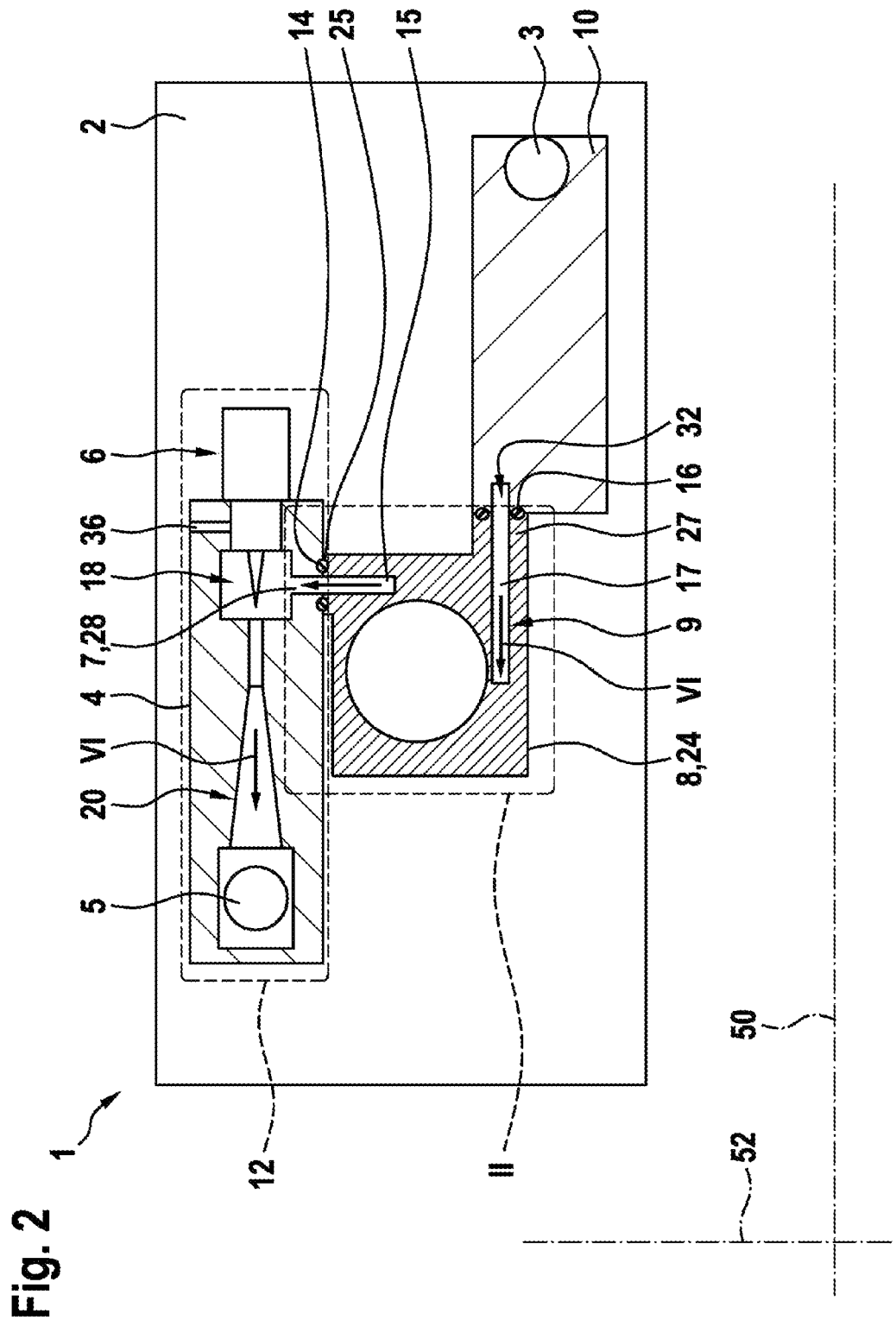
FIG. 2 is a plan view of the conveying device having the components combined valve/jet pump arrangement, recirculation fan and water separator which are positioned on the plate-like carrier element according to a second embodiment.

FIG. 2 is a plan view of a second embodiment of the conveying device 1 according to the disclosure. In this instance, the first flow connection 7 is constructed as a first connection plate 25 to the first internal flow channel 15, wherein the first connection plate 25 is constructed as part of the housing 24 of the recirculation fan 8 and wherein the first connection plate 25 protrudes in the direction of the first flow channel 15 away from the recirculation fan 8. Furthermore, the housing 24 of the recirculation fan 8 is in abutment with the valve/jet pump arrangement 12 in the direction of the first flow channel 15 by means of the first connection plate 25, wherein the first sealing ring 14 is located in the direction of the first flow channel 15 and/or peripherally around the first flow channel 15 between the first connection plate 25 and the valve/jet pump arrangement 12.

It is further shown in FIG. 2 that the second flow connection 9 is constructed as a second connection plate 27 with the second internal flow channel 17, wherein the second connection plate 27 is constructed as part of the housing 24 of the recirculation fan 8 and wherein the second connection plate 27 of the recirculation fan 8 protrudes in the direction of the second flow channel 17 away from the recirculation fan 8. In this instance, the housing 24 of the recirculation fan 8 is in abutment with the water separator 10 in the direction of the second internal flow channel 17 by means of the second connection plate 27, wherein the second sealing ring 16 is located in the direction of the second flow channel 17 and/or peripherally around the second flow channel 17 between the second connection plate 27 and the water separator 10.

Figure 3:
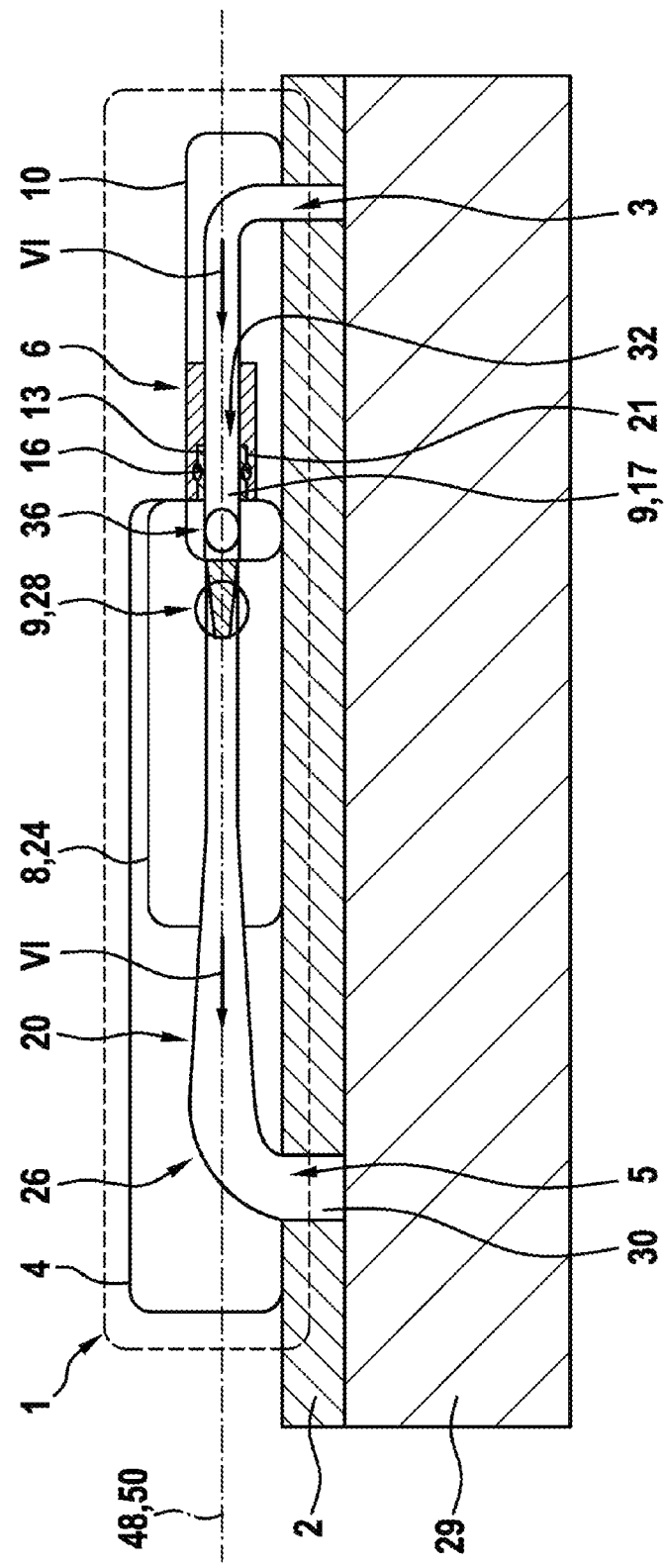
FIG. 3 is a side view of a fuel cell system having the conveying device according to the first embodiment.

FIG. 3 is a side view of the fuel cell system 31 having the conveying device 1 according to the first embodiment. In this instance, it is shown that the components of the conveying device 1, in particular the water separator 10, the recirculation fan 8 and the valve/jet pump arrangement 12 are positioned in such a manner on the plate-like carrier element 2 that the flow lines between and/or within the components of the conveying device 1 extend exclusively parallel with the plate-like carrier element 2, wherein the plate-like carrier element 2 is arranged between the fuel cell 29 and the conveying device 1. In this instance, the gaseous medium which is in particular the recirculation medium flows from the fuel cell 29 via the anode output 3 through the plate-like carrier element 2 into the conveying device 1, in particular into the water separator 10. Within the conveying device 1, the flow lines extend in the components and also between the components, wherein this particularly involves the first flow connection 7 and the second flow connection 9, at least substantially parallel with the plate-like carrier element and consequently at least substantially parallel with the plane 48 shown in FIG. 3. The plane 48 extends in this instance in the direction of the longitudinal axis 50 and the transverse axis 52 (shown in FIG. 2). Consequently, the gaseous medium flows through the conveying device 1 exclusively in the plane 48 which extends at least substantially parallel with the plate-like carrier element 2. Furthermore, there is produced a redirection and/or flow guiding of the gaseous medium in the conveying device 1 exclusively in the region of the recirculation fan 8 and/or the valve/jet pump arrangement 12 and at least substantially parallel with the plane 48 of the conveying device 1. Only in the region of the anode output 3 and the anode input 5, in which the conveying device is connected via the plate-like carrier element 2 to the fuel cell 29, is the flow direction VI left parallel with the plane 48, wherein this region is not located or is only partially located in the region of the conveying device 1, in which an influx and/or a discharge of the gaseous medium from the conveying device 1 is/are carried out. In the region in which the conveying device conveys the gaseous medium back via the anode input 5 into the fuel cell 29, the conveying device 1 has in the region of the jet pump 4 an outlet manifold 26 and a connection piece 30, wherein the connection piece 30 merges into the anode input 5.

Figure 4:
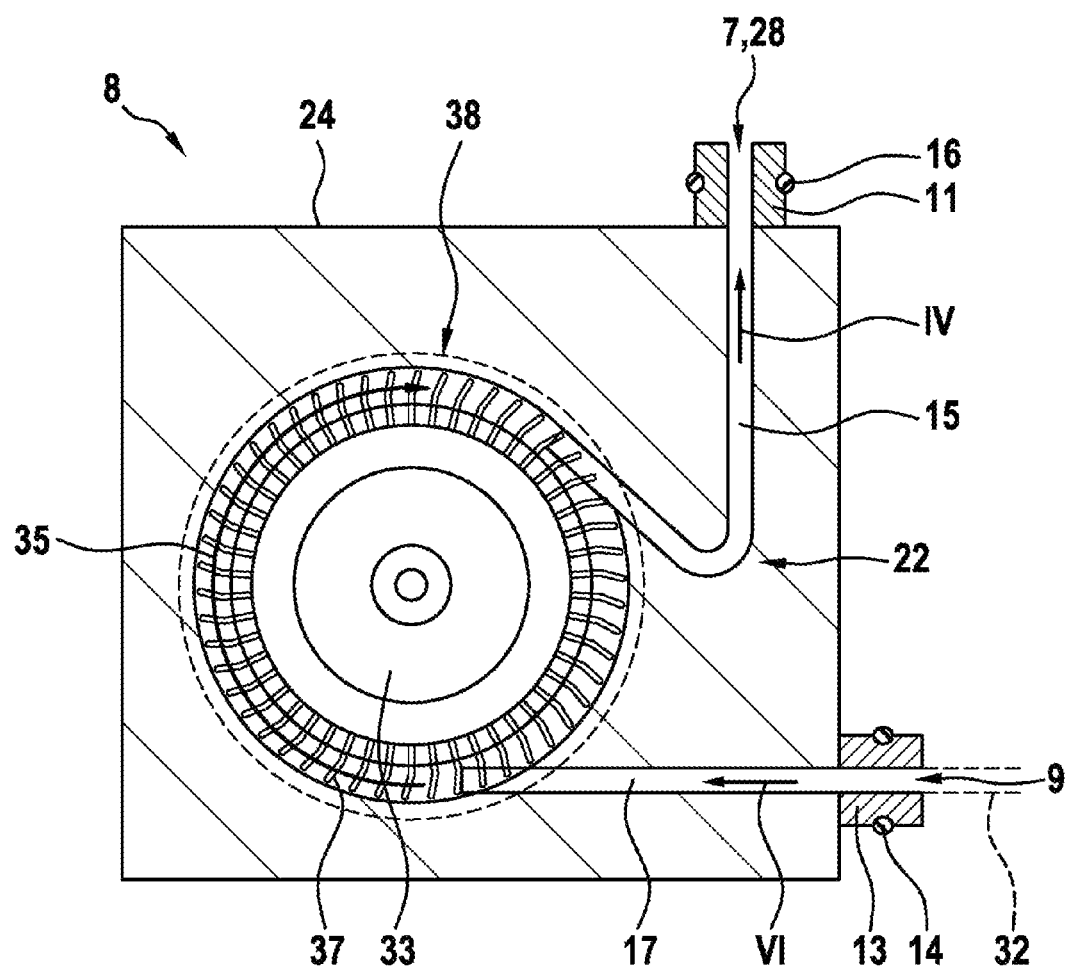
FIG. 4 is a plan view of a cut-out designated II in FIG. 1 of the recirculation fan with a housing.

FIG. 4 is a plan view of the recirculation fan 8 with the housing 24. In this instance, the housing 24 has a second flow connection 9 by means of which the gaseous medium from the outlet 32 of the water separator 10 flows into the recirculation fan 8. In this instance, the gaseous medium flows in the flow direction VI through the second flow connection 9 into the second internal flow channel 17 of the recirculation fan 8. After flowing through the second flow channel 17 in the flow direction VI, the gaseous medium within the housing 34 of the recirculation fan 8 reaches a compressor region 38 having a compressor wheel 33, wherein the compressor wheel 33 carries out a rotation in a rotation direction 35. As a result of the rotation of the compressor wheel 33, on the outer periphery of which turbine blades 37 are arranged, there is an acceleration and/or compression of the gaseous medium in the rotation direction 35 in the compressor region 38 of the recirculation fan 8. After the acceleration and/or compression of the gaseous medium by the compressor wheel 33 is/are complete, the gaseous medium flows in the flow direction VI into the first internal flow channel 15. The first internal flow channel 15 inside the housing 24 of the recirculation fan 8 forms a curvature 22 in this case, wherein a redirection and/or flow guiding of the gaseous medium in the first flow channel 15 is carried out by the curvature 22. In this instance, the redirection of the gaseous medium brought about as a result of the construction of the recirculation fan 8 and/or the conveying device 1 is carried out exclusively at least substantially parallel with the plane 48 pressure losses and friction losses as a result of a redirection of the gaseous medium can be kept low. Furthermore, the region of the curvature 22 is arranged within the housing 24, whereby a required redirection and/or flow guiding of the gaseous medium without additional structural space and/or additional components between the components recirculation fan 8 and valve/jet pump arrangement 12, such as, for example, a pipework, being required. The region of the curvature 22 may in this instance be optimized in technical flow terms in such a manner that the flow cross-section changes in the flow direction VI, for example, in the form of a tapering.

The disclosure is not limited to the embodiments described here and the aspects emphasized therein. Instead, within the scope set out by the claims, a large number of modifications which are within the scope of competent activity are possible.

The invention claimed is:

1. A conveying device for a fuel cell system and configured to at least one of convey and recirculate a gaseous medium, comprising:
a recirculation fan;
a jet pump that is driven by a jet stream of a pressurized gaseous medium;
a metering valve configured to supply the pressurized gaseous medium to the jet pump, the jet pump and the metering valve defining a valve/jet pump arrangement;
an input connected in fluid terms to an anode output of a fuel cell; and
an output connected in fluid terms to an anode input of the fuel cell,
wherein the components of the conveying device are positioned on a plate-like carrier element such that flow lines one or more of between and within the components of the conveying device extend exclusively parallel with the plate-like carrier element, the plate-like carrier element arranged between the fuel cell and the conveying device.

2. The conveying device as claimed in claim 1, wherein the gaseous medium flows through the conveying device in a plane which that extends at least substantially parallel with the plate-like carrier element, and wherein one or more of a redirection and flow guiding of the gaseous medium in the conveying device as carried out within the plane is carried out exclusively in the region of one or more of the recirculation fan and the valve/jet pump arrangement.

3. The conveying device as claimed in claim 1, wherein the recirculation fan defines a first flow connection configured as part of a housing of the recirculation fan, and wherein the first flow connection opens directly into a first inlet of the valve/jet pump arrangement.

4. The conveying device as claimed in claim 1, further comprising a water separator located between the anode output and the recirculation fan and connected in fluid terms thereto, the water separator defining a direct second flow connection with respect to the recirculation fan.

5. The conveying device as claimed in claim 4, wherein the second flow connection is configured as part of a housing of the recirculation fan, and wherein the second flow connection opens directly into an outlet of the water separator.

6. The conveying device as claimed in claim 3, wherein the first flow connection defines a first connection spigot having a first internal flow channel, and wherein the first connection spigot of the recirculation fan protrudes in the direction of the first flow channel away from the recirculation fan.

7. The conveying device as claimed in claim 6, wherein the first connection spigot of the first flow connection protrudes into a first recess of the valve/jet pump arrangement, and wherein a sealing is carried out between the first connection spigot and the first recess by a first sealing ring that is located between an outer diameter of the first connection spigot and an inner diameter of the first recess.

8. The conveying device as claimed in claim 5, wherein the second flow connection defines a second connection spigot having a second internal flow channel, and wherein the second connection spigot of the recirculation fan protrudes away from the recirculation fan in the direction of the second flow channel.

9. The conveying device as claimed in claim 8, wherein the second connection spigot of the second flow connection protrudes into a second recess of the water separator, and wherein a sealing is produced between the second connection spigot and the second recess by a second sealing ring that is located between an outer diameter of the second connection spigot and an inner diameter of the second recess.

10. The conveying device as claimed in claim 3, wherein the first flow connection is configured as a first connection plate with a first internal flow channel, wherein the first connection plate is configured as part of the housing of the recirculation fan, and wherein the first connection plate of the recirculation fan protrudes in the direction of the first flow channel away from the recirculation fan.

11. The conveying device as claimed in claim 10, wherein the housing of the recirculation fan is in abutment via the first connection plate with the valve/jet pump arrangement in the direction of the first flow channel, and wherein a first sealing ring is located one or more of in the direction of the first flow channel and peripherally around the first flow channel between the first connection plate and the valve/jet pump arrangement.

12. The conveying device as claimed in claim 5, wherein the second flow connection is configured as a second connection plate with a second internal flow channel, wherein the second connection plate is configured as part of the housing of the recirculation fan, and wherein the second connection plate of the recirculation fan protrudes in the direction of the second flow channel away from the recirculation fan.

13. The conveying device as claimed in claim 12, wherein the housing of the recirculation fan is in abutment via the second connection plate with the water separator in the direction of the second flow channel, and wherein a second sealing ring is located one or more of in the direction of the second flow channel and peripherally around the second flow channel between the second connection plate and the water separator.

14. The conveying device as claimed in claim 6, wherein the first internal flow channel defines a curvature inside the housing of the recirculation fan, and wherein one or more of a redirection and flow guide of the gaseous medium in the first flow channel is carried out by the curvature.

15. A fuel cell system, comprising:
a fuel cell having an anode input and an anode output; and
a conveying device configured to one or more of convey and recirculate a gaseous medium, the conveying device including:
a recirculation fan, a jet pump that is driven by a jet stream of a pressurized gaseous medium, a metering valve configured to supply the pressurized gaseous medium to the jet pump, the jet pump and the metering valve defining a valve/jet pump arrangement, an input connected in fluid terms to the anode output of the fuel cell, and an output connected in fluid terms to the anode input of the fuel cell, wherein the components of the conveying device are positioned on a plate-like carrier element such that flow lines one or more of between and within the components of the conveying device extend exclusively parallel with the plate-like carrier element, the plate-like carrier element arranged between the fuel cell and the conveying device.

16. The conveying device as claimed in claim 1, wherein the gaseous medium is hydrogen.

17. The conveying device as claimed in claim 6, wherein the first connection spigot is a cylindrical first connection spigot.

18. The conveying device as claimed in claim 7, wherein the first recess is a cylindrical first recess.

19. The conveying device as claimed in claim 8, wherein the second connection spigot is a cylindrical second connection spigot.

20. The conveying device as claimed in claim 9, wherein the second recess is a cylindrical second recess.

* * * * *